US008170006B2

(12) United States Patent
Kouchri

(10) Patent No.: US 8,170,006 B2
(45) Date of Patent: May 1, 2012

(54) DIGITAL TELECOMMUNICATIONS SYSTEM, PROGRAM PRODUCT FOR, AND METHOD OF MANAGING SUCH A SYSTEM

(75) Inventor: Farrokh Mohammadzadeh Kouchri, Boca Raton, FL (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 943 days.

(21) Appl. No.: 12/218,793

(22) Filed: Jul. 17, 2008

(65) Prior Publication Data

US 2010/0014509 A1    Jan. 21, 2010

(51) Int. Cl.
*H04L 12/66* (2006.01)
(52) U.S. Cl. ...................................................... 370/352
(58) Field of Classification Search .................. None
See application file for complete search history.

(56) References Cited

U.S. PATENT DOCUMENTS

| | | | |
|---|---|---|---|
| 2001/0036256 A1 | 11/2001 | Larsson et al. | |
| 2006/0174015 A1* | 8/2006 | Arauz-Rosado | 709/228 |
| 2006/0227728 A1* | 10/2006 | Baumann | 370/260 |
| 2007/0058637 A1* | 3/2007 | Lo | 370/395.2 |
| 2008/0008091 A1* | 1/2008 | Yumoto et al. | 370/230 |
| 2008/0130511 A1* | 6/2008 | Koo et al. | 370/252 |
| 2008/0181201 A1* | 7/2008 | Park et al. | 370/352 |
| 2008/0219244 A1* | 9/2008 | Malhotra et al. | 370/352 |
| 2009/0185557 A1* | 7/2009 | Song et al. | 370/352 |

OTHER PUBLICATIONS

J. Rosenberg, Dynamicsoft, H. Schulzrinne, Columbia U J; "An Offer/Answer Model wit the Session Description Protocol (SDP); rfc3246.txt" IETF Standard, Internet Engineering Task Force, IETF, Ch, Jun. 1, 2002.
Kaplan Acme Packet F Audet Nortel Networks H: "Session Description Protocol (SDP) Offer/Answer Negotiation for Best-Effort Secure Real-Time Transport Protocol; draft-kaplan-mmusic-best-effort-strip-01.txt" IETF Standard-Working-Draft, Internet Engineering Task Force, IETF, Ch, No. 1 Oct. 1, 2006, XP015048267.

* cited by examiner

*Primary Examiner* — Chirag Shah
*Assistant Examiner* — Amar Persaud

(57) ABSTRACT

A digital telecommunications system, a method of managing a communications network in such a system and a program product for managing audio transmission in a digital communications system. A softswitch manages communications between devices at network endpoints, e.g., session initiation protocol (SIP) devices, and detects when communications include a non-human, e.g., an audio system, at an endpoint. The softswitch selects conversational communications for calls between voice devices and messaging communications parameters with lower overhead for communications with an audio system, e.g., messaging systems such as voice mail.

16 Claims, 2 Drawing Sheets

DIGITAL TELECOMMUNICATIONS SYSTEM, PROGRAM PRODUCT FOR, AND METHOD OF MANAGING SUCH A SYSTEM

BACKGROUND OF THE INVENTION

1. Field of the Invention

The present invention is related to reducing transmission overhead in digital telecommunications systems and networks and more particularly, to reducing human to machine overhead in Voice over Internet Protocol (VoIP) based telecommunications.

2. Background Description

State of the art telecommunication systems are digital and, frequently, use Internet Protocol (IP) based communications. Unlike analog voice channels with a continuous analog signal, an IP communications system segments audio data, encodes and packetizes the segments and transmits the encoded IP packets between network entities in a connectionless transfer. Bearing in mind that the human ear has a range of no more than 20 Hertz (20 Hz)-20 KHz and typical telecommunications channels may be only on the order of hundreds of Hz, audio occupies a very small portion of a typical IP communication. Since the minimum sampling rate for a signal to avoid aliasing is twice the highest signal frequency component, a 500 Hz frequency component produces 1000 samples (e.g. 1 KBytes or, for 8 bit samples, 8000 bits) per second. If a single 1 KByte sample is sent every second, there is at least a one second (1 s) latency at the receiving end that is further extended by any transmission delays. Delays between samples cause gaps in the received audio, as well as adding to the latency. So, using packets that are too large and system delays that cause gaps in the transmission such (e.g., causing packet spacing to not be uniform, causes the receiving end audio to halting, fragmented and/or choppy, i.e., what is commonly discussed with Quality of Service (QoS) issues. Trans-Atlantic TV news reports provide common examples of this.

So, standards have been developed and promulgated for Voice over IP (VoIP) communications to insure that typical IP networks compensate for transmission delays and address QoS issues. These standards select adequately small size for audio segments for encoding as relatively small packets and select transmitting those encoded small packets at a relatively high frequency such that decoding and transmission delays are unnoticeable or, at least, tolerable.

G729 is one such standard audio data compression algorithm for VoIP, wherein raw audio is segmented into 10 millisecond segments and each segment is compressed in an IP packet. RFC 3551 defines a net audio data stream for a G729 code/decode (codec) with an 8-kbit/sec data rate. See, e.g., www.apps.ietf.org/rfc/rfc3551.html#sec4.2. Normally, VoIP devices that use the G729 codec, are configured to default for a payload of 20-Bytes/packet with 50-Packets/sec to achieve this 8-kbit/sec data rate. Id.

Real-time Transport Protocol (RTP) packets, for example, include headers that used by IP networks for identification and routing. So, regardless of packet size, 20 or 1000 Bytes, each packet has a fixed overhead. Since packet headers are in addition to and not part of the audio and each packet, regardless of size, includes the same size header, smaller packets incur higher overhead than larger packets. Small packets and high transmission frequency require more channel bandwidth and packet routing and desegmentation requires higher processing capability, i.e., more Machine Instructions per Second (MIPS). Consequently, VoIP communications require a relatively high level of system resources.

Messaging systems, such as voice mail, are common features in modern telecommunications systems. Typically, unanswered calls are routed to voice mail where the caller is greeted with an announcement and/or a voice recorder facility. Although RFC 3551 allows relaxed transfer characteristics that accept higher packetization delays for non-interactive applications (machine-to-machine or browser-to-browser) such as streaming audio/video, IP radio, lectures (webinars) or for links with severe bandwidth constraints, those relaxed transfer characteristics are set by the originating device, e.g., the source of the stream. Such streams based on any G7xx codec use very large RTP packets and may have very large spooler buffer at the receiving end, that spools, perhaps, a few seconds of the media packets.

However, normal VoIP telephony communications between devices in state of the art VoIP communications systems almost always originate with a human, e.g., someone calling from a VoIP phone. The VoIP phone selects transfer parameters for a voice call, i.e., human-to-human. Thus, these human originated calls consume the same level of resources regardless of whether a call is between humans or with a machine, e.g., voice mail. However, reducing the overall consumption of system resources, would allow one to use lower performance systems to handle the same capacity, or achieve increased system capacity for the same system.

Thus, there is a need for reducing VoIP communications overhead, optimizing packet size in VoIP communications system and for minimizing call resource consumption in VoIP communications, especially for human to machine VoIP communications.

SUMMARY OF THE INVENTION

It is a purpose of the invention to reduce VoIP communications overhead;

It is another purpose of the invention to minimize call resource consumption in VoIP communications;

It is yet another purpose of the invention to optimize VoIP communications packet size in human to machine VoIP communications;

It is yet another purpose of the invention to optimize VoIP communications packet in human to machine VoIP communications for reduced VoIP communications overhead and minimized call resource consumption.

The present invention relates to a digital telecommunications system, a method of managing a communications network in such a system and a program product for managing audio transmission in a digital communications system. A softswitch manages communications between devices at network endpoints, e.g., session initiation protocol (SIP) devices, and detects when communications include a non-human, e.g., an audio system, at an endpoint. The softswitch selects conversational communications for calls between voice devices and messaging communications parameters with lower overhead for communications with an audio system, e.g., messaging systems such as voice mail.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
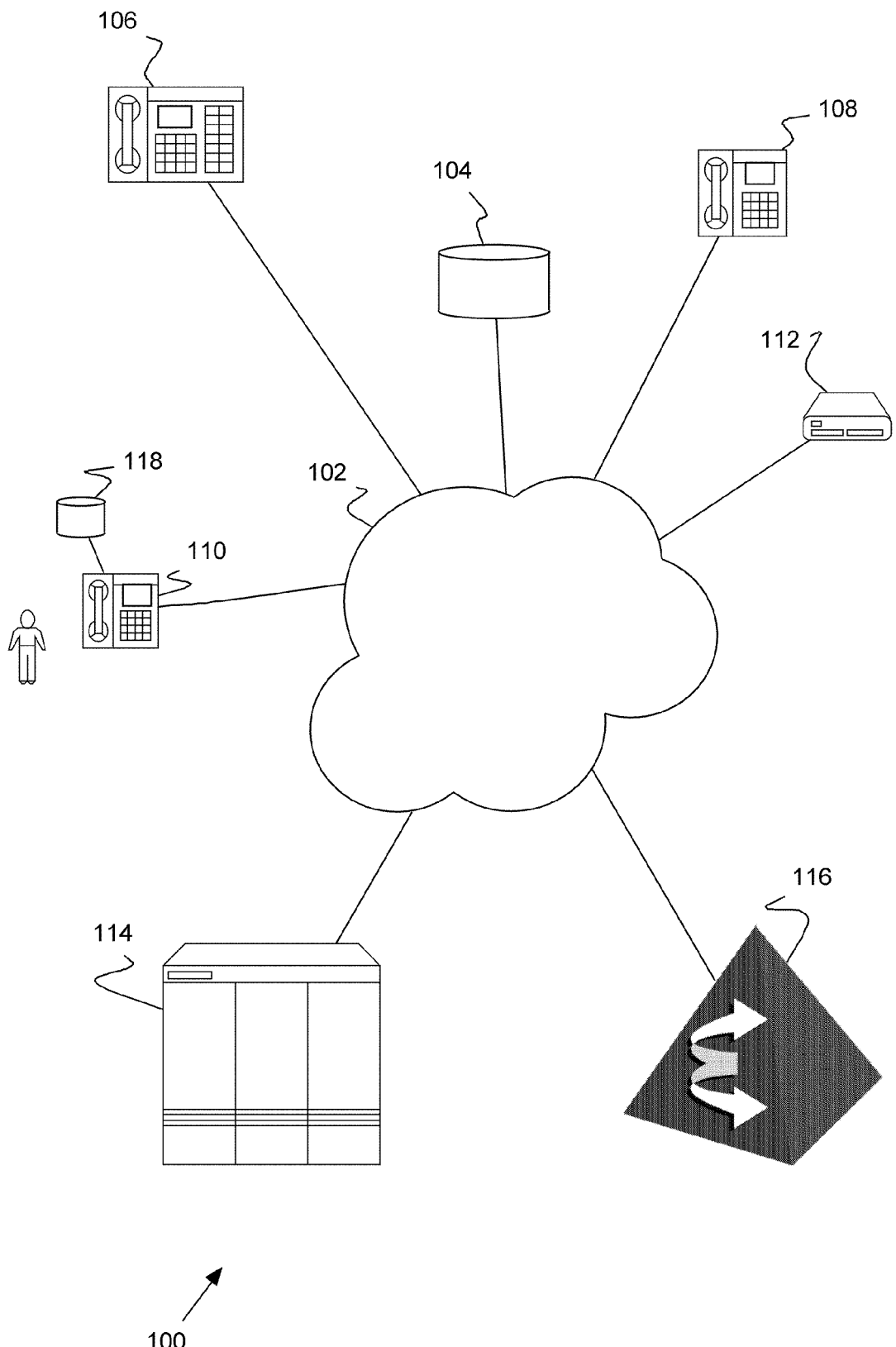
FIG. 1 shows an example of an Internet Protocol (IP) communications system including a digital call capable network with a machine audio response capability system according to a preferred embodiment of the present invention.

Turning now to the drawings and more particularly, FIG. 1 shows an example of an Internet Protocol (IP) communications system 100 including a digital call capable network 102, e.g., capable of Voice over IP (VoIP) communications, with an audio system 104, according to a preferred embodiment of the present invention. The system includes End Points (EP) 106, 108, 110 with connected digital telephony devices (e.g., VoIP phones) and Multimedia Terminal Adapters (MTA), e.g., keysets or session initiation protocol (SIP) phones. Since a network device defines an EP, each EP and a device(s) at the EP are referred to herein interchangeably. A suitable proxy server 112 provides a router function to private network 102. A gateway 114, e.g., a state of the art media gateway, connects the network externally, e.g., to a public switched telephone network/public land mobile network (PSTN/PLMN). A preferred softswitch 116 manages network communications.

A preferred softswitch 116, e.g., a Media Gateway Controller (MGC) located in a data center, manages calls to/from keysets 106, 108, 110 from/to each other, to/from or through the gateway 114 and manages communications with the audio system 104. The audio system 104 may be a system with an audio response capability, e.g., for announcements and/or voice mail (hereinafter voice mail system for simplicity of discussion). In particular, a preferred softswitch 116 detects whether network communications are conversational for real-time human-to-human communications, such as calls with/between the digital telephony devices 106, 108, 110; or that the network communications are messaging with one side being a machine (e.g., voice mail system 104). Preferably, the voice mail system 104 provides transfer characteristics (conversational or messaging) for the connection according to a preferred embodiment of the present invention to reduce overall overhead in communications. Optionally, if the voice mail system 104 does not include a capability for indicating messaging transfer characteristics, upon detecting that the voice mail system 104 is on one side of the communications and that the call is human-to-machine, the softswitch 116 selects appropriate messaging transfer characteristics based on that detection.

Preferably, any network provided devices such as gateway 114, voice-mail-server 104 and announcement-machines (not shown) are capable of standard available G7xx codecs, e.g., GSM, G.723, G.729, G.711. Further, digital telephony devices 106, 108, 110 may be sophisticated processor based VoIP devices that also have such standard codec capability and configured for conversational communications in real-time. However, digital telephony devices 106, 108, 110 may be consumer or user devices with a capability of a subset of those available conversational codecs. Thus, that capability may restrict the network by for codec selection to optimize bandwidth usage.

Since conversational communications are unnecessary with voice mail system 104 (i.e., the comfort of uninterrupted, unhalting (not choppy), undelayed human to human conversation is unnecessary), the preferred softswitch 116 signals messaging transfer characteristics for communications with voice mail system 104. Specifically, the preferred softswitch 116 selects messaging transfer characteristics to minimize overhead. In particular, according to a preferred embodiment of the present invention, the preferred softswitch 116 selects messaging transfer characteristics with a larger packet size and/or lower transfer frequency for human to machine communications. Optionally, the preferred softswitch 116 also lowers packet priority for such human to machine communications.

Optionally, a preferred system 100 may compensate transmission jitter, by spooling the incoming packets into a buffer or local storage at the receiver (e.g., 118 at 110) before decoding and playing audio. While this spooling may itself cause additional delays in playback (e.g., transmission and spooling delays), effectively delaying communication, the delay is acceptable, tolerable and may even be unnoticeable. Delayed audio is most noticeable and intolerable for two communicating partners that also have direct visible contact each other. However, it has been found that, for two partners communicating at a distance and unable to see each other, delays of up to 200 ms are tolerable. So, regarding transmission and spooling delays, the packet transfer rate (number of packets per second), the packet size, and the receiver's spool buffer size are parameterized and configured for a minimal audio delay and, more particularly, not to exceed 200 ms audio delay.

In a typical state of the art IP network for example, with User Datagram Protocol (UDP) transmission selected, payload packets transfer in Real-time Transport Protocol (RTP). The RTP overhead includes IP routing information of 20-Bytes, a UDP identifier of 8-Bytes and an RTP description of 12-Bytes. So, RTP requires a transport header of 40 Bytes per packet (Bpp) to transport a 20-Byte G729 payload. Consequently, using the G729 codec for conversational communications between digital telephony devices 106, 108, 110 at system endpoints, the efficiency is 20 Bpp (net)/60 Bpp (gross)=33%. By contrast where conversational communications are unnecessary, the softswitch 116 may signal, for example, a human to machine (h/m) messaging transfer at 500 Bytes per packet and the transfer rate at 2 packets per second (a period of 500 ms). The efficiency jumps to 93% for human to machine messaging, i.e., 500 Bpp (h/m net)/(500 Bpp+40 Bpp)=500/540=93%. The overall efficiency increases 60%, 93% vs. 33%. It should be noted that the above packet sizes and transfer rates, as well as conversational and messaging codecs, transfer characteristics and protocols are indicated for example only and not intended as a limitation.

Figure 2:
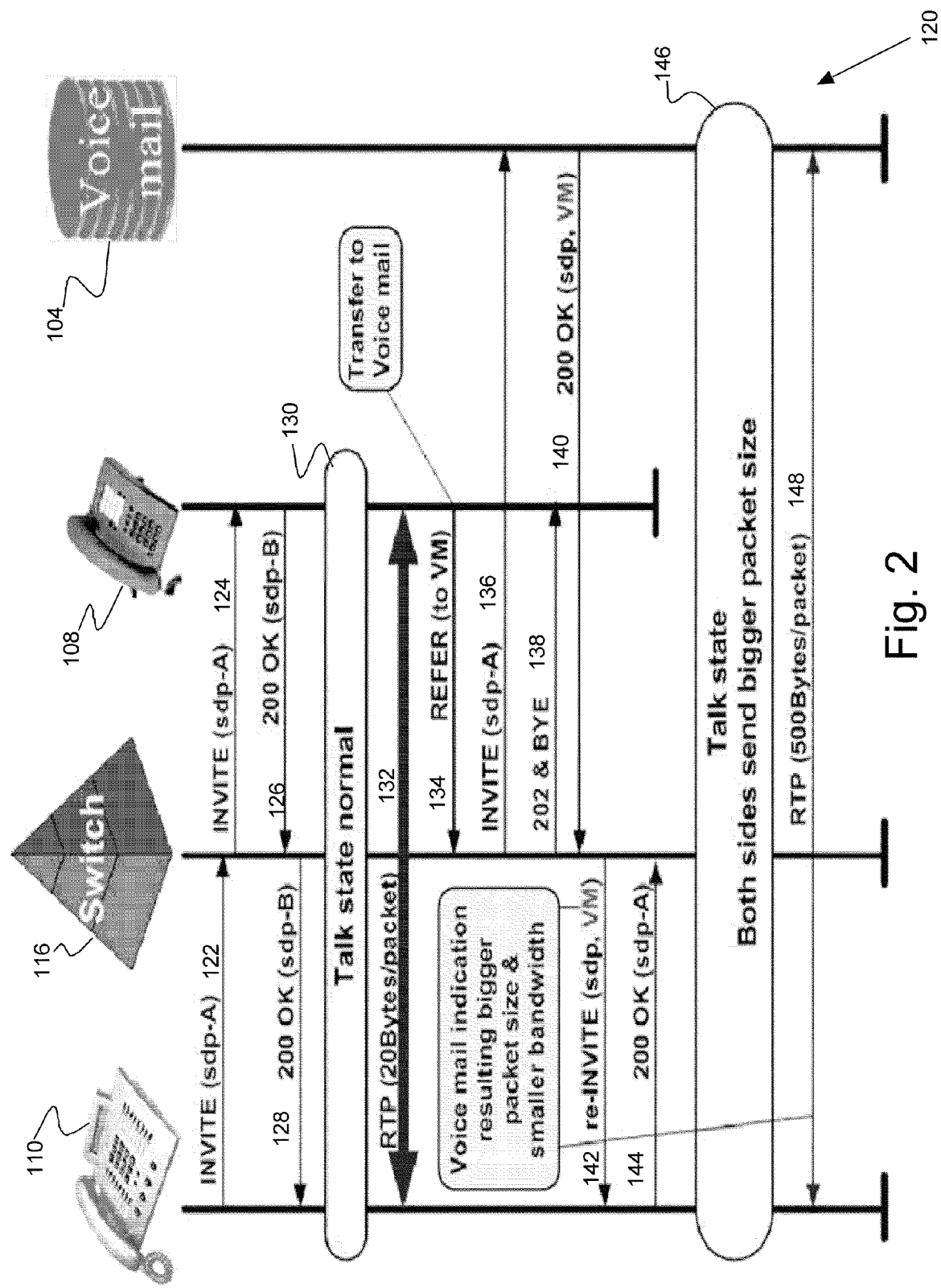
FIG. 2 shows an example of message flow for a call from endpoint to endpoint, and human to machine communications, e.g., voice mail.

FIG. 2, with reference to FIG. 1, shows an example of message flow 120 for a call from endpoint "A" 110 to endpoint "B" 108, subsequently accompanied by human to machine communications (e.g., voice mail) according to a preferred embodiment of the present invention. In normal two-way communications both sides of a communication exchange respective Session Description Protocol (SDP) parameters, e.g., in one or more SIP messages. See, e.g., RFC4566, "SDP: Session Description Protocol," www.apps.ietf.org/rfc/rfc4566.html. With any communication, the originating/transmitting device selects one or more codecs. The selection is included in the SDPs (SDP-A and SDP-B in this example) originating from the device that indicates support by that device of one/multiple codec(s). The receiving device or, the partner to the communications, indicates which supported codec it can encode/decode.

So in the real-time communications portion of this example, endpoint "A" 110 initiates a call by sending 122 an INVITE message to softswitch 116. The INVITE message includes SDP-A information that describes streaming media initialization parameters for the voice-to-voice/human-to-human conversational communications in real-time, e.g., indicating the G729 codec. The softswitch 116 forwards 124 the INVITE message to the called endpoint "B" 108. The called endpoint "B" 108 responds 126 to softswitch 116 with a 200

OK message that also includes SDP-B information. The SDP-B information also indicates G729 codec for a normal conversational connection. The softswitch 116 forwards 128 the 200 OK message to calling endpoint "A" 110, at which point the endpoints 108, 110 enter a normal talk state 130. In the normal talk state 130, the endpoints 108, 110 exchange packets 132, e.g., using the G729 codec in RTP at 20 Bpp.

After a period of conversation (talk) 130, however, the called user at endpoint "B" 108 decides to transfer the rest of the conversation to voice mail (VM) in this example. For example, a secretary/receptionist answers 126 and responds, "Mr. Bond isn't in. Would you like his voice mail?" When the transfer begins when the called endpoint "B" 108 sends a refer message 134 to softswitch 116, referring the caller to voice mail. Then, the softswitch 116 forwards 136 the INVITE message to voice mail system 104 and terminates 138 the connection to the called endpoint "B" 108 with a 202 & BYE message. The INVITE message at 136 still includes the SDP-A information for conversational communications. Responding to the INVITE message, the voice mail system 104 sends 140 a 200 OK message to the softswitch 116 that, in this example, includes SDP,VM information. The ",VM" is a signal that the nature of the call is changing from conversational to messaging. Alternately, the softswitch 116 may be aware that endpoint 104 is a voice mail system and, therefore, that the call is changing from conversational to messaging. In this alternate example, the 200 OK message 140 from the voice mail system 104, may omit the ",VM" signal.

The SDP,VM information includes an indication of messaging transfer characteristics for a human to machine connection that does not require conversational communications and QoS. The messaging transfer characteristics specify the messaging parameters as selected for voice mail messaging, e.g., larger packet size and lower transfer rate for less bandwidth than conversational communications. The softswitch 116 forwards 142 a re-INVITE message to the calling endpoint "A" 110. If the endpoint 104 omitted the ",VM" signal, the softswitch 116 inserts the signal and, either way, that the softswitch 116 forwards 142 a re-INVITE message that includes the SDP,VM information indicating the messaging transfer characteristics. The calling endpoint "A" 110 responds 144 with a 200 OK message to the softswitch 116 that includes SDP-A information, also indicating the messaging transfer characteristics for the human to machine connection.

Upon receiving 144 the 200 OK message the softswitch 116 opens a modified talk state 146 between the calling endpoint "A" 110 and voice mail system 104. In the modified talk state 146, the calling endpoint "A" 110 and voice mail system 104 exchange messaging packets 148 at the more efficient, larger packet size and less frequent transfer rate, e.g., in RTP at 500 Bpp. So as noted hereinabove for this example, conversational, human-to-human communications maintain 33% efficiency; with the human to machine messaging communications selecting larger packets and the higher h/m transfer rate applied to both ends 104, 110, the efficiency is 93% for voice mail communications.

Advantageously, the present invention provides more efficient resource consumption for communications between a human and a machine. Unlike current VoIP systems with fixed media transfer parameters (e.g., packet size and transfer rate) regardless of endpoints communicating, the present invention selects media packet sizes tailored for the communications needs and capabilities of the endpoints. Connections that require higher QoS (human-to-human connections) have higher performance transfer parameters; connections with less demanding requirements (human-to-machine connections) have more relaxed transfer parameters. This improvement is achieved by signaling with call processing signals that indicate to the softswitch whether a connection is a default (human-to-human) connection or a less demanding (human-to-machine (e.g., for announcements, voice-mail and/or answering machines)). Alternately, the softswitch may add transfer parameters and information after detecting that a machine is at least one side of a connection. The softswitch may detect based on received signals or administrative data about communicating partners. System endpoints reconfigure codec data transmission to adapt to the particular situation. This benefits both end points in any human to machine connection, i.e., the phone used by the human and the voice-mail machine.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A digital telecommunications system comprising:
one or more voice communications devices, each at one of a plurality of communications network endpoints;
an audio system at one of said plurality of communications network endpoints; and
a softswitch managing communications between devices at said plurality of communications network endpoints, conversational communications parameters having a first overhead being selected for calls with said one or more voice communications devices, and messaging communications parameters having a second overhead lower than said first overhead being selected for communications with said audio system; and
wherein said digital telecommunications system is a Voice over Internet Protocol (VoIP) system, said audio system is a messaging system, said voice communications devices are VoIP communications devices; and
wherein a first packet size and a first transfer rate is selected for conversational communications and a second packet size and a second transfer rate is selected for messaging communications with said messaging system, said second packet size being larger than the first packet size and said second transfer rate being lower than the first transfer rate.

2. The digital telecommunications system as in claim 1, wherein communications between endpoints have an 8-kbit/sec data rate.

3. The digital telecommunications system as in claim 1, wherein the first packet size is 20-Bytes/packet, the first transfer rate is 50-Packets/sec, the second packet size is 500-Bytes/packet, and the second transfer rate is 2-Packets/sec.

4. The digital telecommunications system as in claim 1, wherein said messaging system is a voice mail system and at least one VoIP communications device includes storage spooling messaging communications from said voice mail system.

5. The digital telecommunications system as in claim 1, wherein said softswitch selectively identifies whether communications at a voice communications device are with said messaging system and selects said messaging communications parameters responsive to identifying said messaging system being at one end of a connection.

6. The digital telecommunications system as in claim 1, wherein said messaging system and said VoIP communications devices are Session Initiation Protocol (SIP) devices, said softswitch determining from SIP messages from said SIP devices whether said messaging system is responding to an INVITE message from a SIP phone and sending a SIP re-INVITE message with messaging Session Description Protocol (SDP) parameters to said SIP phone whenever said messaging system is responding.

7. A method of managing a communications network, said method comprising the steps of:
  a) signaling a call from a first network endpoint of a plurality of network endpoints to a digital communications device connected to another of said plurality of network endpoints;
  b) determining whether a response to said signaled call from a responding network endpoint is from an audio system;
  c) selecting communications parameters for communications between said first network endpoint and said responding network endpoint responsive to said determination; and
  d) opening a talk state between said first network endpoint and said responding network endpoint, communications between said first network endpoint and said responding network endpoint transferring across said network responsive to said selected communications parameters; and
  wherein said audio system is a messaging system and the step (c) of selecting communications parameters comprises selecting conversational communications parameters having a first overhead for calls when a voice communications device is at said responding network endpoint, and selecting messaging communications parameters having a second overhead lower than said first overhead when said messaging system is at said responding network endpoint; and
  wherein said conversational communications parameters indicate a first packet size and a first transfer rate for conversational calls, said messaging communications parameters indicate a second packet size and a second transfer rate for messaging communications with said messaging system, said second packet size being larger than the first packet size and said second transfer rate being lower than the first transfer rate.

8. The method of managing a communications network as in claim 7, wherein said communications transfer in step (d) comprises a User Datagram Protocol (UDP) transmission with payload packets transferring in Real-time Transport Protocol (RTP), conversational communications with voice communications devices having a 33% efficiency, and messaging communications with said messaging system having a 93% efficiency.

9. The method of managing a communications network as in claim 7, wherein said communications system is a Voice over Internet Protocol (VoIP) system and said communications transfer in step (d) is performed with an 8-kbit/sec data rate.

10. The method of managing a communications network as in claim 9, wherein step (d) further comprises spooling transferred communications in storage in a VoIP communications device at said first network endpoint, said spooled communications being played at said VoIP communications device.

11. The method of managing a communications network as in claim 9, wherein signaling comprises sending Session Initiation Protocol (SIP) messages, a softswitch determining in step (b) responsive to SIP messages from endpoints and in step (c) sending a SIP re-INVITE message with messaging Session Description Protocol (SDP) parameters to said first network endpoint whenever said messaging system is at said responding network endpoint.

12. The method of managing a communications network as in claim 7, wherein the step (c) of selecting communications parameters selects a lower priority for communications with said audio system at said responding network endpoint than for communications with a voice communications device at said responding network endpoint.

13. A computer program product for managing audio transmission in a digital communications system, said computer program product comprising a non-transitory computer readable medium having computer readable program code stored thereon, said computer readable program code comprising:
  computer readable program code for receiving Session Initiation Protocol (SIP) messages from network endpoints;
  computer readable program code for forwarding SIP messages to said network endpoints;
  computer readable program code for determining whether a received SIP message is a response to a forwarded SIP message and whether said response originates from an audio system at a network endpoint;
  computer readable program code for selecting communications parameters for communicating endpoints responsive to said determination, conversational communications parameters having a first overhead when a voice communications device is at said responding network endpoint, and selecting messaging communications parameters having a second overhead lower than said first overhead when said audio system is at said responding network endpoint; and
  computer readable program code for opening a talk state between said communicating endpoints, communications between said communicating endpoints transferring across said network responsive to said selected communications parameters; and
  wherein said audio system is a messaging system, said conversational communications parameters indicate a first packet size and a first transfer rate for conversational communications and said messaging communications parameters indicate a second packet size and a second transfer rate for messaging communications with said messaging system, said second packet size being larger than the first packet size and said second transfer rate being slower than the first transfer rate.

14. The computer program product as in claim 13, wherein said computer
  readable program code for selecting communications parameters comprises computer readable program code for sending a re-INVITE SIP message with messaging Session Description Protocol (SDP) parameters responsive to determining whether said response originates from a messaging system.

15. The computer program product as in claim 14, wherein said computer readable program code for opening a talk state comprises computer readable program code for User Datagram Protocol (UDP) transmission with Real-time Transport Protocol (RTP) payload packets, conversational communications between SIP phones having a 33% efficiency, and messaging communications with said messaging system having a 93% efficiency.

16. The computer program product as in claim 13, wherein said computer readable program code for selecting communications parameters comprises computer readable program code for selecting a lower priority for communications with said audio system at said responding network endpoint than for communications with a voice communications device at said responding network endpoint.

* * * * *